(12) United States Patent
Nagamati et al.

(10) Patent No.: US 8,959,648 B2
(45) Date of Patent: Feb. 17, 2015

(54) AUDIO CHALLENGE FOR PROVIDING HUMAN RESPONSE VERIFICATION

(75) Inventors: Romklau Nagamati, Los Angeles, CA (US); Miles Lightwood, Glendale, CA (US)

(73) Assignee: Disney Enterprises, Inc., Burbank, CA (US)

(*) Notice: Subject to any disclaimer, the term of this patent is extended or adjusted under 35 U.S.C. 154(b) by 243 days.

(21) Appl. No.: 12/924,655

(22) Filed: Oct. 1, 2010

(65) Prior Publication Data

US 2012/0084450 A1    Apr. 5, 2012

(51) Int. Cl.
*G06F 21/31* (2013.01)

(52) U.S. Cl.
CPC ........ *G06F 21/31* (2013.01); *G06F 2221/2133* (2013.01)
USPC ............................................ 726/26; 713/182

(58) Field of Classification Search
CPC .................................. G06F 21/31; H04L 9/32
USPC .......................................................... 726/26
See application file for complete search history.

(56) References Cited

U.S. PATENT DOCUMENTS

| | | | |
|---|---|---|---|
| 7,606,915 B1* | 10/2009 | Calinov et al. | 709/229 |
| 7,891,005 B1* | 2/2011 | Baluja et al. | 726/26 |
| 2005/0015257 A1* | 1/2005 | Bronstein | 704/277 |
| 2005/0114705 A1* | 5/2005 | Reshef et al. | 713/201 |
| 2008/0168145 A1* | 7/2008 | Wilson | 709/206 |
| 2008/0312902 A1* | 12/2008 | Dollinger | 704/4 |
| 2010/0161927 A1* | 6/2010 | Sprouse et al. | 711/163 |
| 2010/0318669 A1* | 12/2010 | Chugh | 709/229 |
| 2010/0325706 A1* | 12/2010 | Hachey | 726/6 |
| 2010/0333129 A1* | 12/2010 | Alhadeff et al. | 725/27 |
| 2011/0209076 A1* | 8/2011 | Saxena et al. | 715/764 |
| 2011/0289424 A1* | 11/2011 | Rovik et al. | 715/744 |

* cited by examiner

*Primary Examiner* — Christopher Brown
(74) *Attorney, Agent, or Firm* — Farjami & Farjami LLP

(57) ABSTRACT

There is provided a system and method for audio challenges for providing human response verification. There is provided a method comprising receiving a request to verify whether a client is human controlled, generating, using a database, a challenge question and a corresponding answer set, selecting a plurality of images and an audio instruction corresponding to the challenge question, presenting the plurality of images and the audio instruction to the client, receiving a submission to the challenge question from the client, and responding to the request by verifying whether the submission is contained in the answer set to determine whether the client is human controlled. By utilizing easily understood elements such as common shapes and objects, familiar characters, colors, sizes, orientations, and sounds, even young children can solve the challenge question, whereas automated systems are deterred by the complex audio and image analysis required.

16 Claims, 3 Drawing Sheets

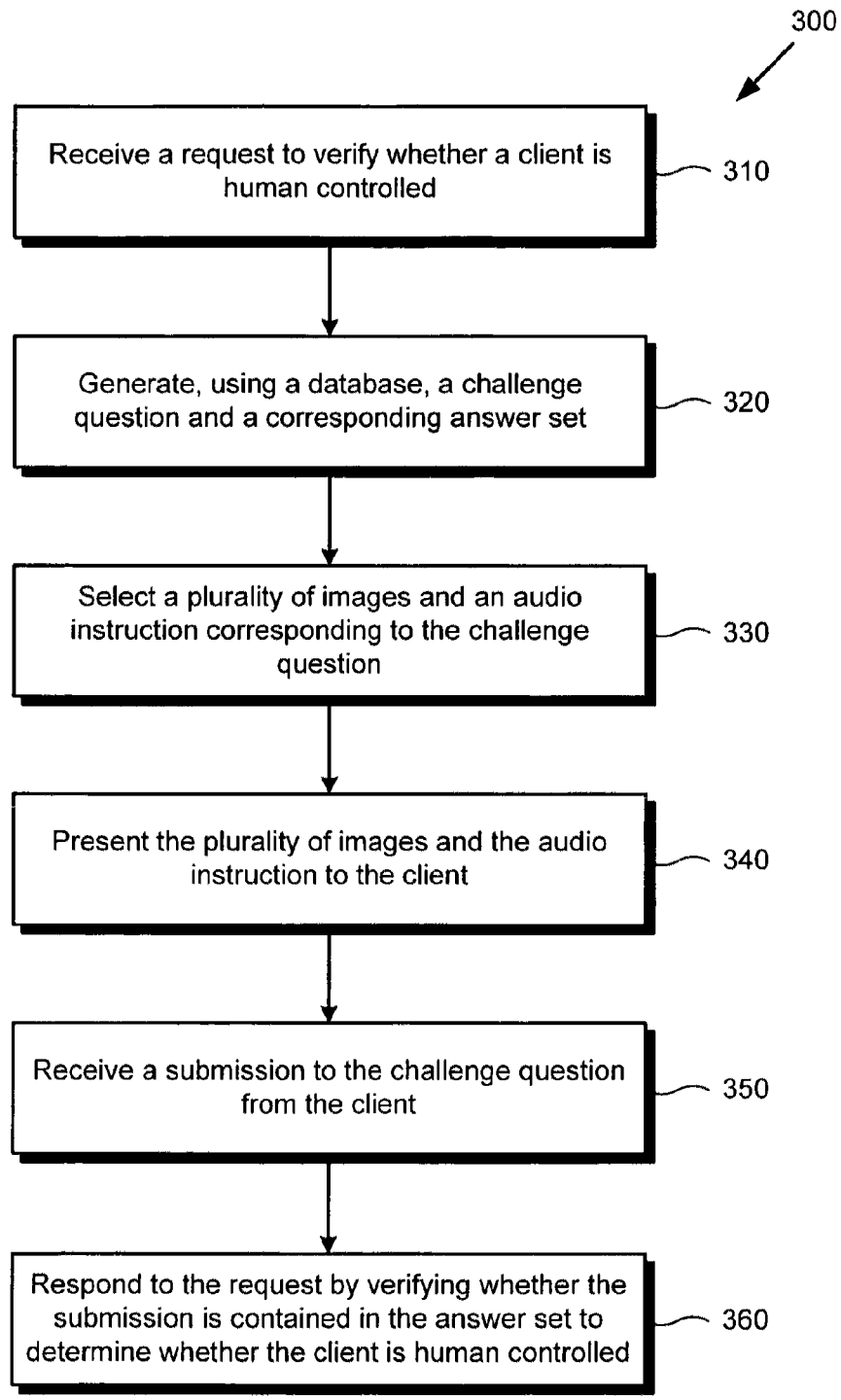

AUDIO CHALLENGE FOR PROVIDING HUMAN RESPONSE VERIFICATION

BACKGROUND OF THE INVENTION

1. Field of the Invention

The present invention relates generally to electronic verification systems. More particularly, the present invention relates to electronic verification systems for identifying human users.

2. Background Art

Human verification systems, such as CAPTCHAs, are well known in the art. Website portals, e-commerce sites, discussion forums, social networks, online games, public databases, and other applications often employ human verification systems to prevent the use of automated systems. Often, allowing unfettered access to automated systems or "bots" poses numerous problems, such as server overloading, inequitable access to resources, vulnerability to brute force attacks, and facilitation of abusive behavior such as spamming/unsolicited advertising, vote rigging, and spreading of malware. The use of effective human verification systems to limit interactions to verified humans helps to mitigate the ill effects from the above problems.

Ideally, to provide the most effective human verification system, the verification step should be easily solved by a human yet difficult for a machine to automatically process without the aid of human intelligence. Until recently, CAPTCHAs have been effective in that ideal, but automated systems have largely caught up to CAPTCHAs by employing advanced image recognition algorithms and data mining. In response, CAPTCHAs are becoming more obfuscated and complicated to deter these advanced automated systems.

Unfortunately, these defensive measures have also made CAPTCHAs more difficult for humans to solve as well. As a result, many users, when confronted with a difficult CAPTCHA, may become discouraged and decide to give up and go elsewhere. Furthermore, the increasing use of complicated English words and phrases without any helpful context may alienate and frustrate users having limited English skills. As a result, content and service providers stand to lose valuable user uptake and market share, particularly younger users lacking strong written language skills or users in non-English speaking cultures.

Accordingly, there is a need to overcome the drawbacks and deficiencies in the art by providing a human verification system that is simple for humans to solve across diverse age groups and cultures while still providing effective deterrence against automated systems.

SUMMARY OF THE INVENTION

There are provided systems and methods for audio challenges for providing human response verification, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 3 shows a flowchart describing the steps, according to one embodiment of the present invention, by which an audio challenge may be administered to provide human response verification.

DETAILED DESCRIPTION OF THE INVENTION

The present application is directed to a system and method for audio challenges for providing human response verification. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1A:
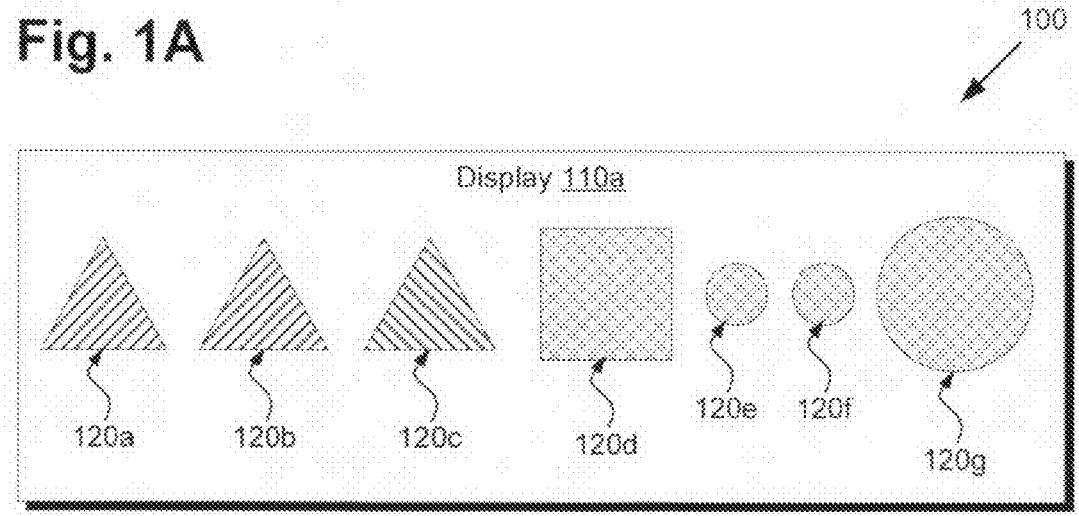
FIG. 1A presents a diagram of an image for administering an audio challenge for providing human response verification, according to one embodiment of the present invention.

FIG. 1A presents a diagram of an image for administering an audio challenge for providing human response verification, according to one embodiment of the present invention. Diagram 100 of FIG. 1A includes display 110a. Display 110a includes shapes 120a, 120b, 120c, 120d, 120e, 120f, and 120g.

As shown in display 110a of FIG. 1A, shapes 120a through 120g comprise easily recognizable and common geometric shapes that would be familiar for young children. The visible portion of display 110a in FIG. 1A may show only a small portion of a larger context, such as a web browser executing on an operating system of a personal computer. An audio challenge may be issued to the user, for example to count the number of shapes having specific characteristics. The audio challenge may be audible through a speaker or headphone, and may be localized according to the detected language of the client.

One audio challenge may ask the user to distinguish colors, for example by counting the number of red triangles (2), where shapes 120a and 120b comprise red colored triangles and shape 120c comprises a blue colored triangle. For example, a voice prompt may state, "Please count the number of red triangles." To provide additional deterrence against automated robots, color hues may be varied, for example by using both light blue and dark blue. Humans may easily recognize different shades or tints of colors as belonging to the same blue color family, but computer systems may require advanced image processing to derive the same conclusion.

Another audio challenge may ask the user to distinguish between different shapes, such as by counting the number of squares (1), or shape 120d. Yet another audio challenge may ask the user to distinguish size, for example by counting the number of small circles (2), where shapes 120e and 120e comprise small circles and shape 120g comprises a large circle. These shape and size distinctions may be easily recognized by humans but difficult for automated robots to recognize, requiring advanced image processing.

After the user determines the answer to the audio challenge, the user may then provide the answer by, for example, selecting the answer choice from a list using a mouse, keyboard, gamepad, or touch screen, by manually typing in an answer, by speaking the answer using a microphone, or by using another input device. If the answer is correct, then the user may be redirected to the original requested content, such as an online portal, social community, or gaming site. If the answer is incorrect, the user may be given more chances through additional challenge questions before the system concludes that the client is potentially an automated robot. If such a conclusion is made, measures to deter automated robots may then be employed, such as temporarily blocking access from the IP address of the client.

Since the question is delivered as an audio challenge, automated robots must employ advanced audio analysis to determine the question being asked, whereas a human only needs to listen to the audio to understand the question being asked. Moreover, since the audio challenge may be localized for different locales, the audio analysis must also identify which language is being spoken and include separate processing engines for each spoken language. Furthermore, by using an open ended answer system, for example by accepting spoken or typed responses instead of selecting from a closed list, brute force or random selection can be avoided, further deterring automated robots.

Figure 1B:
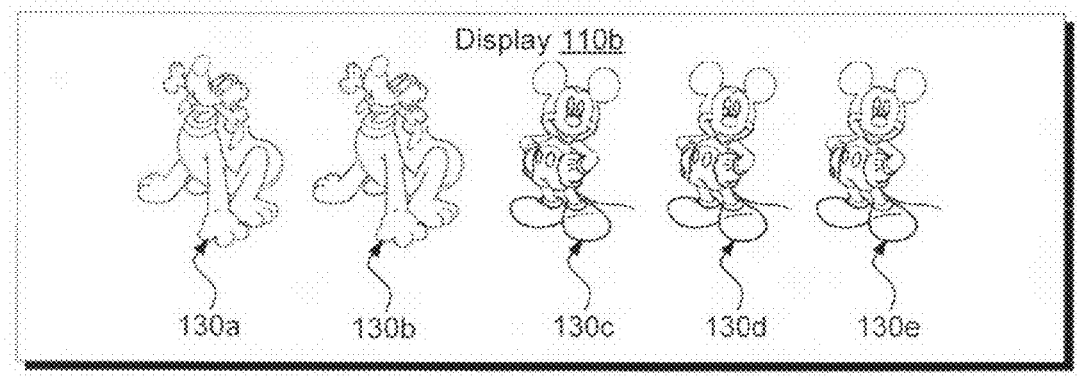
FIG. 1B presents a diagram of an image for administering an audio challenge for providing human response verification, according to another embodiment of the present invention.

Moving to FIG. 1B, FIG. 1B presents a diagram of an image for administering an audio challenge suitable for providing human response verification, according to another embodiment of the present invention. Diagram 100 of FIG. 1B includes display 110b. Display 110b includes images 130a, 130b, 130c, 130d, and 130e.

As shown in display 110b of FIG. 1B, images 130a through 130e comprise easily recognizable characters that would be familiar for young children. Similar to the shapes in FIG. 1A, an audio challenge may be issued to the user, for example to count the number of a specific character. One audio challenge may ask the user to distinguish specific characters, for example by counting the number of Mickey Mouse characters (3), where images 130a and 130b comprise the Pluto character and images 130c, 130d, and 130e comprise the Mickey Mouse character. Alternatively, another audio challenge may ask the user to distinguish specific animals or other categories, for example by counting the number of dogs (2) shown, where images 130a and 130b comprise images of dogs and images 130c through 130e comprise images of mice. Besides characters and animals, other easily recognizable and familiar objects may be presented, for example images of common fruits such as apples and oranges. These familiar characters and common objects are easy for humans to distinguish but difficult for automated robots to recognize, requiring advanced image processing.

Figure 1C:
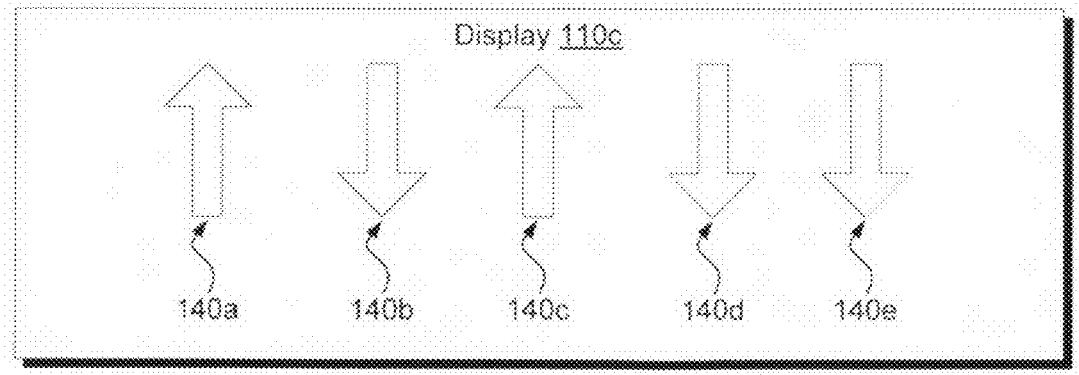
FIG. 1C presents a diagram of an image for administering an audio challenge for providing human response verification, according to another embodiment of the present invention.

Moving to FIG. 1C, FIG. 1C presents a diagram of an image for administering an audio challenge suitable for providing human response verification, according to another embodiment of the present invention. Diagram 100 of FIG. 1C includes display 110c. Display 110c includes arrow 140a, 140b, 140c, 140d, and 140e.

As shown in display 110c of FIG. 1C, arrows 140a through 140e comprise arrow shapes oriented in specific directions. Similar to the shapes in FIG. 1A and the images in FIG. 1B, an audio challenge may be issued to the user, for example to count the number of a specific arrow direction. One audio challenge may ask the user to count the number of arrows pointing down (3), where arrows 140a and 140c point up and arrows 140b, 140d and 140e point down. Alternatively, the challenge may be rephrased to use slightly different terminology such as north/south/east/west or upright/upside down. For clarity, orientations may be limited to orthogonal or right angle rotations only. These orientations are easy for humans to distinguish but difficult for automated robots to recognize, requiring advanced image processing.

In further embodiments, the user may be presented with an audio or video clip player, which plays an example sound clip or video clip. For example, an audio clip may include the sounds of two dog barks and three cat meows, and an audio challenge may be issued to the user to identify or count the number of dog barks or cat meows heard in the audio clip. For further automated robot deterrence, the pitch, length, timbre, and other characteristics of the sounds may be adjusted, for example to simulate the sound of a small and a large dog bark. A human may easily recognize that the different barks are still dog barks, whereas an automated system would need to use sophisticated audio analysis to group the different barks as belonging to the same sound family. A video clip may, for example, slowly pan through a scene showing various objects, such as two dogs and three cats, and an audio challenge may be issued to the user to identify or count the number of dogs or cats shown in the video clip. Different breeds of cats and dogs might be shown in the video clip, and the video clip may include other visual information such as people and background landscapes, thereby requiring advanced image processing by automated robots. Additionally, the audio and video clips may be played using different playback offsets and runtimes, playback speeds, and other parameters to further deter automated robots. These audio or video clips are easy for humans to understand as only listening or viewing is required, whereas automated robots must employ advanced audio and image recognition techniques.

Any of the challenge types or distinguishing criteria discussed above in conjunction with FIGS. 1A, 1B, and 1C may also be combined as well. For example, looking at FIG. 1B, image 130d may be flipped vertically, and an audio challenge may be issued to the user to count the number of upside-down Mickey Mouse characters (1), or image 130d. In another example, image 130a may be colored red and image 130b may be colored green, and an audio challenge may be issued to the user to count the number of red Pluto characters (1), or image 130a. Moreover, while the examples have focused on the identification, counting, and answering of a specific number of objects, alternative embodiments may ask for other answers besides numbers. For example, in FIG. 1A, an audio challenge may be issued to the user to provide the color of shape 120a, where the correct answer is "Red" in the user's local language.

By leveraging built-in audience awareness through familiar and recognizable characters and topics, the human verification process may feel like a fun game-like experience, which may be essential for retaining the interest of younger audiences. Rather than struggling with arbitrary, boring, and difficult verification puzzles using strange words and phrases with obfuscated and difficult to read text as with conventional CAPTCHAs, users can instead response to audio challenges using friendly iconic visual cues sourced from familiar and well-known subjects. Thus, even young children lacking strong written language skills can easily solve the audible human verification challenge. As a result, content providers may enjoy increased user retention as users are fully engaged and may actually enjoy the verification step rather than perceiving the verification as an unrelated chore that is locking out desired content.

Figure 2:
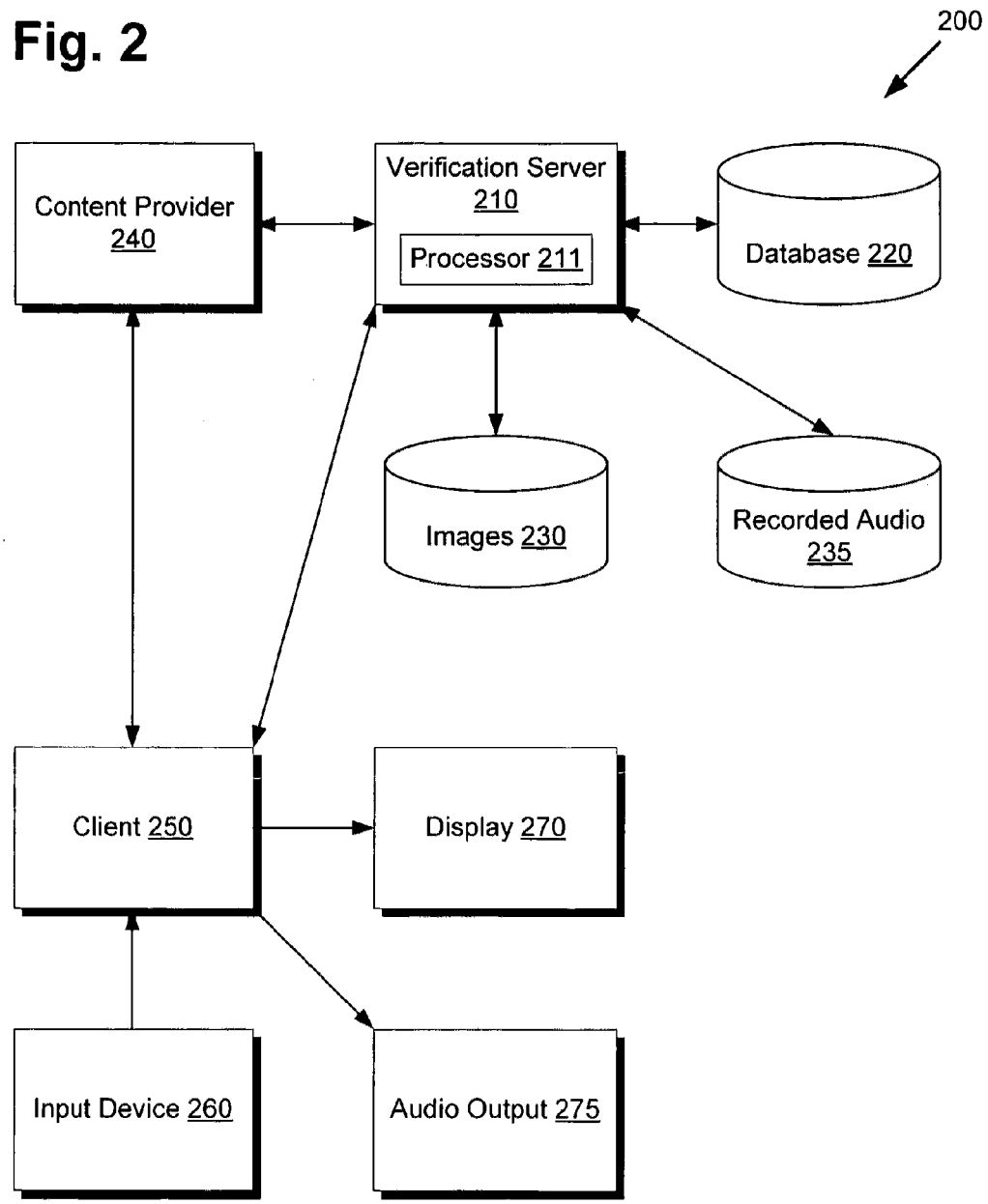
FIG. 2 presents a system diagram for administering an audio challenge for providing human response verification, according to one embodiment of the present invention.

FIG. 2 presents a system diagram for administering an audio challenge for providing human response verification, according to one embodiment of the present invention. Diagram 200 of FIG. 2 includes verification server 210, database 220, images 230, recorded audio 235, content provider 240, client 250, input device 260, display 270, and audio output 275. Verification server 310 includes processor 311. Display 110a, 110b, and 110c of FIGS. 1A, 1B, and 1C may each correspond to display 270 in FIG. 2.

Diagram 200 of FIG. 2 presents one exemplary network configuration, where content provider 240 utilizes verification server 210 to verify whether accessing clients are human controlled or automated. However, alternative embodiments may combine the functions of verification server 210 and content provider 240 into a single entity. A public network, such as the Internet, may support communications links between components of diagram 200. Content provider 240 may, for example, provide a public discussion forum targeted towards kids and families. This public discussion forum may provide features such as voting polls, message boards, social networking, and other services that may be detrimentally affected if exposed to automated systems or non-human control. For example, robots may be programmed to rig poll results by generating dummy accounts to vote multiple times, or robots may be programmed to distribute spam, malware, and other malicious content through the provided message boards and social networking features. To prevent this behavior, it is desirable to verify whether a client is human controlled or automated, granting access only to human controlled clients.

Thus, before providing a user account to client 250, content provider 240 should verify that client 250 is human controlled rather than an automated system or a robot. By, for example, previous mutual arrangement, content provider 240 may therefore request that verification server 210 determine whether client 250 is human controlled. Thus, verification server 210 may consult database 220, which may include a database of recorded challenge questions and corresponding answers. Alternatively, processor 211 may generate challenge questions and answers on the fly by combining and assembling components referenced in database 220. The records in database 220 may refer to media files stored in images 230, which may include character images and other graphics, and recorded audio 235, which may include voice prompts and other audio clips. If video clips are to be presented, then a video store may also be referenced (not shown in FIG. 2). Some challenge questions may include answer sets with multiple valid responses, for example both "Violet" and "Purple" might be valid answers for a question regarding the color of an object.

The visual portion of the challenge question may then be presented on display 270 of client 250, and the audio portion, including the spoken question, may be output via audio output device 275, which may comprise, for example, speakers or headphones. The user may then submit a response to the challenge question using input device 260, which may comprise a keypad, remote control, mouse, touchscreen, microphone, camera, or any other input device. Verification server 210 may then determine whether the submission from client 250 matches against the answer set, and inform content provider 240 accordingly. Assuming a positive response, content provider 240 may then grant permission for client 250 to access content that requires verification, such as registration for a new user account that permits full community participation.

FIG. 3 shows a flowchart describing the steps, according to one embodiment of the present invention, by which an audio challenge may be administered to provide human response verification. Certain details and features have been left out of flowchart 300 that are apparent to a person of ordinary skill in the art. For example, a step may comprise one or more sub-steps or may involve specialized equipment or materials, as known in the art. While steps 310 through 360 indicated in flowchart 300 are sufficient to describe one embodiment of the present invention, other embodiments of the invention may utilize steps different from those shown in flowchart 300.

Referring to step 310 of flowchart 300 in FIG. 3 and diagram 200 of FIG. 2, step 310 of flowchart 300 comprises processor 211 of verification server 210 receiving a request from content provider 240 to verify whether client 250 is human controlled. Continuing with the example discussed above, content provider 240 may comprise a web server providing kids and family oriented discussion forum and community. Client 250 may access content provider 240 using a web browser over the Internet, and may access content that requires verification, such as when registering for a new user login. Before content provider 240 allows client 250 to register as a new user, it may send a request to verification server 210 to verify whether client 250 is human controlled. In this manner, deterrence against automated systems can be provided.

Referring to step 320 of flowchart 300 in FIG. 3 and diagram 200 of FIG. 2, step 320 of flowchart 300 comprises processor 211 of verification server 210 generating, using database 220, a challenge question and a corresponding answer set. As previously described, the challenge question and corresponding answer set may be prerecorded in database 220, or processor 211 may generate the question and answer set on the fly by using resources stored in database 220. Using the example previously described for FIG. 1B, the question may comprise, "How many times do you see Mickey Mouse?", and the answer set may include "3" or "Three".

Referring to step 330 of flowchart 400 in FIG. 4 and diagram 200 of FIG. 2, step 330 of flowchart 300 comprises processor 211 of verification server 210 selecting a plurality of images and an audio instruction corresponding to the challenge question. For example, the plurality of images may be retrieved from references in database 220 pointing to images 230, and the audio instruction may be retrieved from references in database 220 pointing to recorded audio 235. If a video clip is to be used, then the plurality of images may comprise the frames of the video clip. As previously discussed, since the challenge question and answer may be localized according to the locale of client 250, recorded audio 235 may include multiple language recordings. If appropriate, the images within images 230 may also be localized as well. Thus, if the detected locale is English speaking, an English speaking recorded voice of "How many times do you see Mickey Mouse?" may be retrieved from recorded audio 235, and images of Pluto and Mickey may be retrieved from images 230.

Referring to step 340 of flowchart 300 in FIG. 3 and diagram 200 of FIG. 2, step 340 of flowchart 300 comprises processor 211 of verification server 210 presenting the plurality of images and the audio instruction from step 330 to client 250. Thus, display 270 connected to client 250 may show an interface similar to display 110b of FIG. 1B. The audio instruction may then be output via audio output 275.

Referring to step 350 of flowchart 300 in FIG. 3 and diagram 200 of FIG. 2, step 350 of flowchart 300 comprises processor 211 of verification server 210 receiving a submission to the challenge question presented in step 340 from client 250. Thus, the user of client 250 may use input device 260 to provide the submission in various ways, as previously described. For example, display 110b may include a text box or a drop down selection menu for entry of the answer response. Alternatively, if input device 260 comprises a microphone, the user may speak the answer submission into input device 260. In another embodiment, if input device 260 comprises a camera, the user may use signs, such as raised digits, to indicate the answer submission.

Referring to step 360 of flowchart 300 in FIG. 3 and diagram 200 of FIG. 2, step 360 of flowchart 300 comprises processor 211 of verification server 210 responding to the request received from step 310 by verifying whether the submission from step 350 is contained in the answer set generated in step 320 to determine whether client 250 is human controlled. If the submission is by direct typing or selection, then comparison to the answer set is straightforward. However, if the answer is provided by voice or video, then audio or image analysis may be carried out on the input data to convert to a plain text answer, which may then be compared to the answer set in a straightforward manner. Assuming the provided submission is indeed contained within the answer set, processor 211 can report to content provider 240 that client 250 is likely human and should be granted permission for registering as a new user. Otherwise, verification server 210 may report to content provider 240 that client 250 failed to pass human verification. At this point, content provider 240 may request that verification server 210 restart the process again from step 320, to give client 250 another chance. There may be a limit enforced to the number of retries possible within a given time period to deter brute force attacks from automated systems.

Thus, automated robots and their detrimental effects can be deterred and avoided by using the described human verification system. At the same time, users can enjoy a fun and engaging game-like challenge with a difficulty level suitable for young children. By utilizing voice instructions and graphic images rather than written instructions, the user is not required to understand written language, but only verbal language and familiar visual cues which may be learned at an early age. Moreover, since the instructions may be localized for the user's particular locale, the challenge system may be employed internationally across diverse cultures, rather than forcing users to type phrases in English only, as in prior human verification systems such as CAPTCHA. Additionally, by combining challenge types, the difficulty of circumventing the system through automated robots becomes much higher, while the difficulty for humans to solve the challenge is not significantly increased. In this manner, effective deterrence against automated systems is provided while maintaining a challenge system suitable for children.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A method for use by a system having a processor for administering an audio challenge for providing human response verification, the method comprising:
   receiving a request to verify whether a client is human controlled;
   generating, by the processor, using a database, a challenge question and a corresponding answer set, wherein the challenge question includes identifying a sound audible in an audio clip by having the client count a number of times the sound is audible in the audio clip;
   selecting the audio clip corresponding to the challenge question;
   selecting an audio instruction from a plurality of stored audio instructions corresponding to the challenge question;
   presenting the audio clip and the audio instruction to the client;
   receiving a submission to the challenge question from the client, wherein the submission includes the number of times the sound is audible in the audio clip; and
   responding to the request by verifying whether the submission is contained in the answer set to determine whether the client is human controlled.

2. The method of claim 1, wherein the presenting of the audio instruction is by outputting to a speaker of the client.

3. The method of claim 1, wherein the plurality of images comprise a plurality of characters.

4. The method of claim 1, wherein the plurality of images comprise a plurality of common objects.

5. The method of claim 1, wherein the plurality of images comprise a plurality of colors.

6. The method of claim 1, wherein the plurality of images comprise a plurality of sizes.

7. The method of claim 1, wherein the plurality of images comprise a plurality of orientations.

8. The method of claim 1, wherein the plurality of images comprises a video clip, and wherein the challenge question further includes identifying objects visible in the video clip.

9. A server for administering an audio challenge for providing human response verification, the server comprising:
   a processor configured to:
      receive a request to verify whether a client is human controlled;
      generate, using a database, a challenge question and a corresponding answer set,
      wherein the challenge question includes identifying a sound audible in an audio clip by having the client count a number of times the sound is audible in the audio clip;
      select the audio clip corresponding to the challenge question;
      select an audio instruction from a plurality of stored audio instructions corresponding to the challenge question;
      present the audio clip and the audio instruction to the client;
      receive a submission to the challenge question from the client, wherein the submission includes the number of times the sound is audible in the audio clip; and
      respond to the request by verifying whether the submission is contained in the answer set to determine whether the client is human controlled.

10. The server of claim 9, wherein the processor is further configured to present the audio instruction by outputting to a speaker of the client.

11. The server of claim 9, wherein the plurality of images comprise a plurality of characters.

12. The server of claim 9, wherein the plurality of images comprise a plurality of common objects.

13. The server of claim 9, wherein the plurality of images comprise a plurality of colors.

14. The server of claim 9, wherein the plurality of images comprise a plurality of sizes.

15. The server of claim 9, wherein the plurality of images comprise a plurality of orientations.

16. The server of claim 9, wherein the plurality of images comprises a video clip, and wherein the challenge question further includes identifying objects visible in the video clip.

* * * * *